Figure 1:
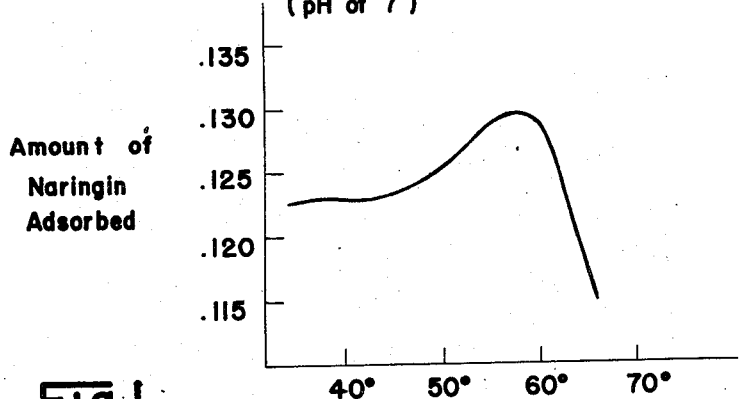

Patented June 6, 1950

2,510,797

UNITED STATES PATENT OFFICE 2,510,797

REMOVAL OF NARINGIN FROM SOLUTIONS CONTAINING THE SAME

Everette M. Burdick, Weslaco, and Robert H. Maurer, Pharr, Tex., assignors to Texsun Citrus Exchange, Weslaco, Tex., a corporation Application April 13, 1948, Serial No. 20,816

8 Claims. (Cl. 99—105)

The invention relates to the removal of naringin from aqueous solutions, and more particularly the invention relates to the removal of naringin, a bitter glucoside, from aqueous solutions, extracts, juices, syrups, and the like obtained from the grapefruit tree.

So far as is known, naringin, a bitter glucoside having the empirical formula $C_{27}H_{32}O_{14}$, is found only in the species of citrous commonly known as grapefruit. Much of the characteristic flavor of grapefruit is due to this bitter glucoside, and it has often been associated with quinine because of the similarity of bitter taste. Naringin is found in higher concentrations in the flower of the grapefruit and most abundantly in the albedo layer of the peel, and membranes and cores of the fruit. It occurs in lower concentration in the plant. The bitter juice of the grapefruit contains from about 0.01 per cent (0.01%) to as high as 0.08 per cent (0.08%) naringin depending upon the maturity of fruit and age. It has been found that the naringin content is higher in immature fruit than it is in older fruit. Additionally, variations in the naringin content have also been observed in different varieties of grapefruit; for example, the red-meated varieties of grapefruit have lower naringin content than the more common white-meated varieties.

Several different methods have been proposed for removing naringin from grapefruit products. These methods, generally, make use of the solubility of naringin at elevated temperatures or in various solvents and subsequent crystallization of the naringin from the solvent. However, the methods heretofore used always produce a mother liquor that is saturated with naringin at the temperature of crystallization. For example, as naringin is crystallized from an aqueous solution at 20° C. the mother liquor will still contain approximately .05 per cent (.05%) naringin and will be intensely bitter to the taste, since as little as .01 per cent (.01%) naringin can be detected by its bitter taste.

The present invention is directed to a process wherein naringin can be readily removed from aqueous solutions so completely that no bitter taste remains.

Another object of the invention is to adjust the pH and temperature of a solution containing naringin whereby the removal of the naringin can be readily effected.

Another object of the invention is to adjust the pH and temperature of a solution containing naringin whereby the removal of the naringin can be readily effected by the addition of activated carbon or char to the solution whereupon the naringin present in the solution will be adsorbed upon the activated carbon.

Another object of the invention is to add activated carbon to a solution which contains naringin to effect removal of the naringin from such solution and thereafter separating the carbon and adsorbed naringin thereon from the solution.

Still another object of the invention is to add a quantity of activated carbon to a solution containing naringin and agitating the resulting mixture of carbon with the solution in order to provide an intimate contact between the activated carbon and the solution and to also remove objectionable odors associated with the carbon.

Figure 2:
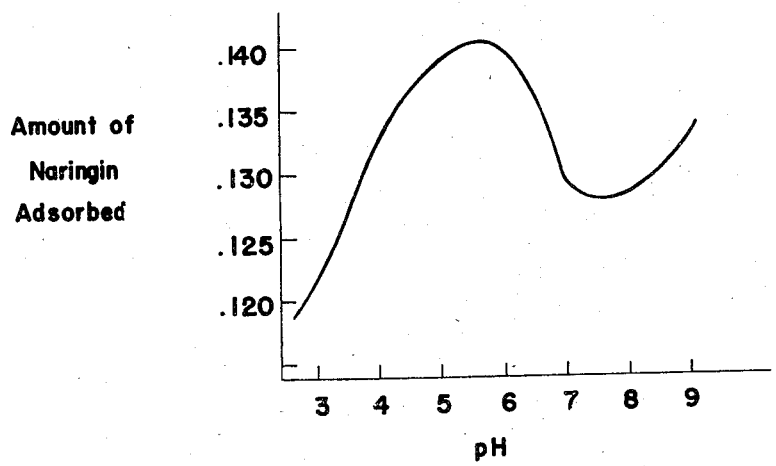

Other and further objects and advantages of the invention will become more readily apparent from a consideration of the following description and drawing wherein:

Figure 1 illustrates the optimum temperature conditions in practising the invention; and Figure 2 illustrates the optimum pH range in practising the invention.

We have discovered that naringin can be removed from a solution containing naringin by the hereinafter described procedure.

The pH of the solution containing naringin should be adjusted to between 3.5 and 7.0. After the solution has thus been treated in order to obtain this desired pH range, a quantity of activated carbon or char is added or contacted with the solution. The amount of activated carbon necessary to remove the naringin from the solution will, of course, vary with the adsorptive capacity of the particular carbon being used. However, both of these factors can be readily determined by well-known analytical means, and the amount of activated carbon needed is then calculated so that it will be added in a quantity sufficient to remove the naringin from the solution. In general, we have found that approximately one per cent (1%) of activated carbon is sufficient to remove not only the naringin but also to produce a very satisfactory decoloration. Of course, a smaller percentage of activated carbon is required in the case of specially activated carbons. The temperature of the mixture of activated carbon and the solution is then elevated to between 45° and 65° C. It has been found that when the solution is maintained at this temperature, the removal of the naringin is more readily effected. The temperatures can be readily maintained by any suitable means, and it has been found that commercial vacuum evaporators serve the purpose quite well. While subjecting the mixture to the heating, we prefer to provide adequate agitation during the period of treating or contact with the activated carbon. Additionally, we choose to closely control the temperature within the specified range. Any suitable means can be provided whereby the solution is agitated during the period that it is being heated and during its period of contact with the activated carbons, and it has been found that the heating of the solution may provide sufficient agitation thereof. This agitation serves to provide an intimate contact between the activated carbon and the solution, while the evaporation also serves to remove certain objectionable odors associated with the carbons.

As previously mentioned, the heating of the solution can be effected in any suitable manner; however, we prefer to conduct the carbon treatment during concentration of the solution in a vacuum evaporator for several reasons. First of all, the optimum temperature range is easily maintained whereby the naringin can be more effectively removed since its concentration is constantly being built up due to the evaporation of volatile components of the solution. Therefore, more naringin can be adsorbed per unit of activated carbon. Also, the evaporation process provides a good agitation.

After the solution has been retained at the preferred, specified temperature range for a period of from 10 to 20 minutes, the carbon can then be separated from the remaining solution or mother liquor. Of course, the solution can be retained at an elevated temperature in order to concentrate it to the desired consistency; however, we have found it advantageous to separate the carbon from the solution before such solution becomes too viscous to be filtered readily. While any suitable means such as filtration, centrifuging or settling can be used to effect removal of the carbon from the solution, we have found that filtration serves the purpose quite readily. If, for example, naringin is being removed from a syrup, such as described in the application of Everette M. Burdick and James S. Allen, filed of even date herewith, application Serial No. 20,815 filed on the 13th day of April, 1948, we have found that filtration rates decrease rather rapidly when the concentration of the syrup is increased beyond 25° to 30° Brix. If desired, filter aid may be added in order to produce a sparkling filtrate entirely free of activated carbon. The following examples are illustrative of the invention as described herein:

*Example 1.—Removal of naringin from an aqueous solution*—A solution of pure naringin was made by dissolving 0.050 gram of crystalline naringin (prepared by crystallization from a water extract of grapefruit peel) in water that had been adjusted to a pH of 6 and finally making up to a volume of 100 ml. To this solution which was held in constant temperature bath maintained at 57.5° C. was added 0.25 gram of activated carbon (Darco S-51). The solution was contacted with the active carbon for 15 minutes with mild agitation. The carbon was then filtered from the solution and the filtrate analyzed for naringin. It was found to contain only 0.015% naringin. Thus 70% of the naringin was removed, and one pound of active carbon was found to remove as much at 0.140 pound of naringin under these conditions.

*Example 2.—Removal of naringin from clarified grapefruit juice*—After clarification a sample of grapefruit juice was found to contain 0.053% naringin and 12% dissolved solids, the pH was adjusted to 6.7 during the final clarification step. To 4000 ml. of this clarified grapefruit juice 60 grams of activated carbon was added and the mixture placed in a vacuum evaporator. The contact period was conducted during evaporation at approximately 26 in. Hg vacuum, and at a temperature of about 50° C. The solution was evaporated until the solids content had risen to 24%, during this time the pH had fallen to 6.2. After filtration or separation to remove the activated carbon containing the adsorbed naringin the solution was found to contain only 0.0043% naringin, or only 0.00215% when calculated back to a 12% solids content. In this case 96% of the naringin was removed and no trace of bitterness was noticeable at the resulting low concentrations.

It will be noticed that in Example 2 one pound of activated carbon adsorbed or removed only 0.033 pound of naringin while one pound of carbon removed 0.140 of naringin from the water solution. Thus approximately four times as much activated carbon is required in the case of clarified juices that contain many other materials that are simultaneously adsorbed by the carbons and greatly reduce the carbon's ability to adsorb naringin. We can use less activated carbon than given in the Example 2, but prefer to employ approximately the amount cited to insure not only complete naringin removal but also adequate color removal at the same time.

The following graphs serve to illustrate the optimum pH range and temperature range for obtaining the most desirable results with the invention. The data presented in the form of graphs in the drawings shown in Figs. 1 and 2 were obtained in similar experiments as shown by Examples 1 and 2.

While it is believed that the invention is apparent from the foregoing, by way of further illustration and amplification it will be assumed that the invention is to be practiced upon a grapefruit syrup, as disclosed in the application of Everette M. Burdick and James S. Allen, executed of even date herewith, Serial No. 20,815 filed on the 13th day of April, 1948.

After the grapefruit syrup has been subjected to a treatment to separate the suspended solids therefrom, it is treated by adjusting the pH to between 3.5 and 7. The necessary amount of carbon is then added and the solution heated. This effects removal of naringin from the grapefruit syrup, and thereafter the carbon can be removed from the solution and such solution further concentrated to the desired consistency.

Additionally, it is to be noted that, if desired, this invention could be also applied to the peel liquor described in the application of Everette M. Burdick and James S. Allen, executed of even date herewith, Serial No. 20,814 filed the 13th day of April, 1948, in order to remove the naringin from such peel liquor.

It is to be noted that the invention has been particularly described wherein the char, or carbon, is added to the solution, however, the solution and carbon can be contacted in any suitable manner such as a carbon column in order to remove the naringin from the solution.

While the invention has been particularly described as applying to the removal of naringin from grapefruit juices and syrups, it seems obvious that it could be practiced also upon aqueous solutions and extracts obtained from any part or parts of the grapefruit tree including flowers or blossoms, leaves, trunk, limbs, roots and fruit.

Broadly, the invention contemplates a method of processing a solution containing naringin in order to effect removal of the naringin therefrom.

What is claimed is:

1. The method of removing naringin from an aqueous solution comprising the steps of, adjusting the pH of the naringin containing solution to the range of 3.5 to 7.0, contacting a quantity of activated carbon to the naringin solution in an amount to provide an adsorptive capacity to adsorb the naringin from the solution, elevating the temperature of the naringin containing solution to the range of from 50° C. to 60° C., agitating the naringin solution while thusly treated, and thereafter filtering the treated solution to separate the activated carbon and naringin adsorbed thereon from solution.

2. A process for removing naringin from a solution containing naringin including the steps of, adjusting the pH of said solution to the range of 3.5 to 7, contacting a quantity of activated carbon to said solution in an amount to present a sufficient surface area to adsorb the naringin from said solution, elevating the temperature of the mixture of carbon and naringin containing solution to effect adsorption of the naringin on the carbon, and simultaneously agitating said mixture of carbon and naringin containing solution to provide an intimate contact of said carbon with said solution.

3. A process for removing naringin from a solution containing naringin including the steps of, adjusting the pH of said solution to the range of 3.5 to 7, contacting a quantity of activated carbon to said solution in an amount to present a sufficient surface area to adsorb the naringin from said solution, elevating the temperature of the mixture of carbon and naringin containing solution to effect adsorption of the naringin on the carbon, and simultaneously agitating said mixture of carbon and naringin containing solution to provide an intimate contact of said carbon with said solution, and thereafter separating the carbon from solution.

4. In a process for removing naringin from a solution containing naringin where the pH of such solution is between 3.5 and 7 and where the temperature of the solution is about 50 to 60° C., the step of adding a quantity of activated char to said solution to remove the naringin from the solution by adsorbing it on said char.

5. In a process for removing naringin from a solution containing naringin where the pH of such solution is between 3.5 and 7 and where the temperature of the solution is about 50 to 60° C., the step of adding a quantity of activated char to said solution to remove the naringin from the solution by adsorbing it on said char, and thereafter separating said activated char from said solution.

6. A process for removing naringin from citrous extracts containing naringin comprising the steps of adjusting the pH of said extract to about 3.5 to 7.0, adding a quantity of activated carbon to said extract in an amount sufficient to afford enough surface area to adsorb substantially all of the naringin from said extract, heating the mixture of extract and activated carbon to approximately 60° C., agitating the heated mixture, and thereafter separating the activated carbon from said extract.

7. A method of removing naringin from a solution which contains naringin comprising the steps of, adjusting the pH of the solution, adding a quantity of activated carbon to said solution, heating the mixture of carbon and solution, and thereafter separating the carbon from said solution.

8. A method of removing naringin from a solution which contains naringin comprising the steps of, maintaining the pH of the solution within a predetermined range, contacting a quantity of activated carbon with said solution, heating the mixture of carbon and solution, and thereafter separating the carbon from said solution.

EVERETTE M. BURDICK.
ROBERT H. MAURER.

REFERENCES CITED

The following references are of record in the file of this patent:

UNITED STATES PATENTS

| Number | Name | Date |
|---|---|---|
| 1,166,674 | Gould et al. | Jan. 4, 1916 |
| 1,849,576 | Karrer | Mar. 15, 1932 |
| 2,421,061 | Higby | May 27, 1947 |
| 2,421,062 | Higby | May 27, 1947 |